United States Patent Office 2,978,343
Patented Apr. 4, 1961

2,978,343

REMOISTENABLE ADHESIVE COMPOSITIONS

Joseph D. Russo, San Mateo, Calif., and Richard A. Weidener, Berkeley Heights, N.J., assignors to National Starch and Chemical Corporation, a corporation of Delaware No Drawing. Filed Oct. 9, 1958, Ser. No. 766,195

2 Claims. (Cl. 106—128)

This invention relates to a new type of adhesive composition. More particularly, this invention relates to the specific class of adhesives known in the art as "remoistenable adhesives." A dried film of a remoistenable adhesive upon a sheet of paper is characterized by its ability, upon the application of water, to become tacky and thus permit the adhesion of the paper to another surface. This property results in the extensive use of these adhesives in such applications as envelopes and gummed labels.

It is the object of this invention to provide stable, ready to use compositions of remoistenable adhesives. It is a further object of this invention to provide such stable, ready to use remoistenable adhesives which when coated upon paper will result in a minimal amount of curling on the part of the paper.

Heretofore, aqueous solutions of water soluble adhesives, particularly dextrines and animal glues, have often been utilized as remoistenable adhesives. However, the use of dextrine and animal glue solutions does involve some difficulties, in particular the tendency for papers coated with these materials to curl and buckle. This curling results from the unequal rates of expansion and contraction on the part of the paper backing in relation to the adhesive film during fluctuations in the relative humidity.

Various techniques have been proposed in an attempt to overcome this curling. One such method involves a departure from the usual procedure of applying the water soluble adhesive to the paper in the form of an aqueous solution. It is, instead, formulated as a suspension of the dextrine or animal glue adhesive in an organic solvent solution of a second water soluble adhesive, e.g. polyvinyl methyl ether; a further requisite being that the solvent utilized is one in which the first adhesive component is insoluble. When this mixture is applied to the surface of a sheet of paper, the volatile solvent evaporates leaving a film which appears to the eye to be continuous, but which is, in fact, discontinuous, being composed of the water soluble adhesive particles which are bound to each other, and to the paper, by means of the second water and organic solvent soluble adhesive. As a result of the particulate nature of this film, there is a marked decrease in the amount of curling in paper thus coated. It should be noted that this adhesive system is anhydrous. Even though the adhesive and binder are water-soluble, water is not present in the adhesive composition, the only fluid being the organic solvent.

Although these adhesive suspension systems have been successful in controlling paper curl, their use has, in turn, led to a new problem for the practitioner. This problem involves the stability of these compositions. It has been found that they cannot be stored for any appreciable period without having a major portion of the suspended water soluble adhesive settle out of the organic solvent in which it is dispersed, and form a hard packed mass which is almost impossible to redisperse.

To overcome this instability, the user of the composition has been forced to either keep the system under constant agitation, or to prepare the mixture himself immediately prior to use. Neither of these methods is, of course, practical or economical in view of the high speed, mechanized techniques employed in modern industry.

Consequently, both the adhesive manufacturers and the adhesive customers have been severely handicapped. The manufacturers, on their part, have not been able to prepare or sell these adhesives in the form of a one-package product because it would become useless upon storage in drums; while the ultimate users of these remoistenable adhesives have, as a result of this lack of a one-package product, found themselves forced into becoming, in a sense, adhesive formulators. Obviously, this state of affairs has been both costly and time consuming for all concerned.

We have now discovered a method for preparing remoistenable, non-curling adhesive compositions which are stable for prolonged periods, with remarkably little settling out of the adhesive component. Our composition comprises the following:

(a) A solution of a water-soluble adhesive in a water-miscible organic solvent.

(b) A second water-soluble adhesive suspended in the solution of (a), said adhesive being insoluble in the particular organic solvent used.

(c) A critical amount of water, namely from 3% to 12%, based on the total weight of the composition.

It will be seen that the above composition is quite similar to the suspension system previously described, except that whereas the prior known system was anhydrous, our composition deliberately incorporates a minor, but critical, amount of water. It is this water which, contrary to anything which might have been predicted, has been found to be effective in retarding, or preventing, the settling and resulting packing of the dispersed adhesive. In other words, the water makes the difference between a composition which is unstable and therefore cannot be stored in drums for any length of time, and a stable, one-package composition which may be manufactured, stored in containers for any desired length of time, and used without further preparation other than possible light mixing.

In addition to their notable stability against settling, our adhesive compositions are characterized by the flat, non-curling properties of their cast and dried films.

In order to produce the best possible adhesive composition, in accordance with our invention, the following conditions should be kept in mind:

(1) The organic solvent must be one which is miscible with the amount of water used. Examples of solvents which we have used successfully include the water-soluble, low molecular weight alcohols such as methyl, ethyl and isopropyl alcohol; also the water soluble ketones such as acetone, methyl ethyl ketone and methyl butyl ketone.

(2) The adhesive which is to be in the dissolved phase must of course be one which is soluble in the particular organic solvent used, but it must also be water soluble. Polyvinyl methyl ether is one example of such a suitable adhesive; other examples include polyvinyl pyrrolidone; the copolymer of vinyl methyl ether with maleic anhydride; hydroxypropyl methyl cellulose ether; also the neutralized copolymer of vinyl acetate and crotonic acid.

(3) The second adhesive, which is suspended in the organic solvent, must be insoluble in the particular organic solvent used, but it must be water-soluble. Dextrines and animal glues are the most suitable adhesives of this type.

(4) The amount of water should be, as previously stated, within 3% and 12% of the total weight of the composition. Lesser amounts are not effective in imparting stability, and larger amounts impair the quality of the composition by tending to dissolve and precipitate that portion of the adhesive which should remain suspended.

(5) As to proportions, the amount of water has already been stated to lie within the range 3% to 12%, based on the weight of the total composition. The amount of the first adhesive, dissolved in the organic solvent, should be from about 5% to 50%; the second adhesive, insoluble in and suspended in the organic solvent, should be from about 25% to about 65%; the organic solvent itself should be present in the amount of from about 10% to 55%, all these percentages being based on the weight of the total composition. Obviously, because of the many variables possible in choice of the suspended adhesive, the dissolved adhesive, and the organic solvent, many variations are possible within the stated proportions. By judicious manipulation of the proportions, well within the skill of the person in the art, desired variations in the properties of the ultimate adhesive compositions may be attained.

(6) In order to obtain the best product, it is advisable that the following sequence be adhered to in formulating the composition. First, the organic solvent soluble adhesive (e.g. polyvinyl methyl ether) is dissolved in the solvent. Then the water is added, followed by the addition of the organic solvent insoluble adhesive (e.g. dextrine, animal glue) to form the suspension. An attempt to suspend the solvent-insoluble adhesive in the solution of the solvent-soluble adhesive, followed by addition of water, often results in an unworkable mass.

The following examples will illustrate the embodiment of our invention. All parts are given by weight, unless otherwise specified.

*Example I*

This example illustrates a typical procedure used in the preparation of our improved adhesives.

Into a vessel equipped with mechanical agitation were placed 30 parts of polyvinyl methyl ether and 25 parts of ethyl alcohol. After solution had been effected, 7 parts of water were added. At this point 38 parts of water-soluble corn dextrine were introduced and the mixture was then agitated until a homogeneous dispersion was obtained.

When coated on paper the solvent component evaporated, leaving an apparently continuous film upon the paper. Paper sheets coated with this composition were observed for extensive periods, with no curling being noted despite extensive variations in the relative humidity. When moisture was applied to these adhesive films, they became tacky and were easily adhered to other surfaces such as paper, yielding a strong, durable bond.

*Example II*

This example illustrates the superior stability of our adhesive compositions as contrasted with compositions lacking the specified amounts of water required by our invention.

Into a graduated cylinder was poured 100 ml. of the composition described in Example I. This cylinder was labelled "A." Into a similar cylinder was poured 100 ml. of a composition identical in content to that of Example I except that no water had been used in its formulation. This cylinder was labelled "B." After being sealed to retard evaporation, the cylinders were placed upon storage racks where they would be free from any vibration or jarring. After 30 days had elapsed it was observed that in cylinder "B" approximately 28%, by volume, of solids had settled to the bottom of the cylinder. When a glass rod was inserted into this cylinder it was found that these solids had settled into an extremely hard packed mass which could not be redispersed. In cylinder "A," on the other hand, there were only about 6%, by volume of settled out solids. Furthermore, these solids were easily redispersed upon agitation with a glass rod. The notably improved stability of our compositions was thus clearly indicated.

*Example III*

This example illustrates a number of different adhesive compositions which were prepared in order to demonstrate the wide range of materials which may be employed in formulating our adhesives. These formulations were all prepared according to the procedure described in Example I, i.e. the solvent-soluble adhesive was first dissolved in the solvent, followed by the addition of the water and then finally the solvent-insoluble adhesive.

The following table lists the various compositions which were prepared. For purposes of brevity, we refer to the solvent-insoluble adhesive component (e.g., dextrine, animal glue, etc.) as Adhesive "A," and the solvent-soluble adhesive (e.g., polyvinyl methyl ether, etc.) is designated Adhesive "B."

| Adhesive "A" | | Adhesive "B" | | Organic Solvent | | Water, Parts |
| --- | --- | --- | --- | --- | --- | --- |
| Type | Parts | Type | Parts | Type | Parts | |
| (1) | tapioca dextrine | 65 | copolymer of vinyl methyl ether and maleic anhydride. | 22 | methyl alcohol | 10 | 3 |
| (2) | potato dextrine | 28 | hydroxypropyl methyl cellulose ether. | 5 | acetone | 55 | 12 |
| (3) | animal glue | 25 | polyvinyl pyrrolidone | 50 | isopropyl alcohol | 20 | 5 |
| (4) | do | 35 | neutralized copolymer of vinyl acetate and crotonic acid. | 40 | methyl ethyl ketone | 15 | 10 |
| (5) | do | 42 | polyvinyl methyl ether | 10 | methyl butyl ketone | 40 | 8 |

All of the above described compositions exhibited excellent stability, with little or no settling of solids, and when applied to paper they yielded films which had excellent properties as remoistenable adhesives. Furthermore, no curling was noted in any of the paper stock which had been coated with these adhesives.

Summarizing, our process provides for improved remoistenable adhesive compositions. These compositions are characterized by their high degree of stability as well as by their ability to yield non-curling films when cast upon paper. Depending the particular circumstances, innumerable variations may be made in working procedures and ingredients without departing from the spirit and scope of our invention, which is limited only by the following claims.

We claim:

1. A remoistenable adhesive composition, consisting essentially of a mixture of (A) a solution of a water-soluble adhesive selected from the class consisting of polyvinyl methyl ether, polyvinyl pyrrolidone, hydroxypropyl methyl cellulose ether, the copolymer of vinyl methyl ether with maleic anhydride and the neutralized copolymer of vinyl acetate and crotonic acid, in a water-miscible organic solvent for said adhesive selected from the class consisting of methyl alcohol, ethyl alcohol, isopropyl alcohol, acetone, methyl ethyl ketone and methyl butyl ketone, and (B) a water-soluble adhesive selected from the class consisting of dextrine and animal glue, the adhesive of (B) being insoluble in the organic solvent of (A) and being suspended therein, and (C) water, the amount of water being from 3% to 12%, the amount of the adhesive of (A) being from 5% to 50%, the amount of the adhesive of (B) being from 25% to 65% and the amount of organic solvent being from 10% to 55%, all based on the total weight of the composition, said composition being relatively stable against settling of the suspended adhesive particles upon storage.

2. A method for making a remoistenable adhesive composition comprising dissolving a water soluble adhesive selected from the class consisting of polyvinyl methyl ether, polyvinyl pyrrolidone, hydroxypropyl methyl cellulose ether, the copolymer of vinyl methyl ether with maleic anhydride and the neutralized copolymer of vinyl acetate and crotonic acid, in a water-miscible organic solvent for said adhesive selected from the class consisting of methyl alcohol, ethyl alcohol, isopropyl alcohol, acetone, methyl ethyl ketone and methyl butyl ketone, then mixing water with said solution, and then suspending in said solution a water-soluble adhesive which is insoluble in the said organic solvent and selected from the class consisting of dextrine and animal glue, the amount of water being from 3% to 12%, the amount of the adhesive dissolved in said solvent being from 5% to 50%, the amount of the adhesive suspended in said solvent being from 25% to 65%, and the amount of organic solvent being from 10% to 55%, all based on the weight of the total composition.

References Cited in the file of this patent

UNITED STATES PATENTS

| | | |
|---|---|---|
| 2,477,344 | Neumann | July 26, 1949 |
| 2,577,281 | Smith et al. | Dec. 11, 1951 |
| 2,624,715 | Wildish | Jan. 6, 1953 |
| 2,793,966 | Davis | May 28, 1957 |